(12) United States Patent
Park et al.

(10) Patent No.: US 10,564,036 B2
(45) Date of Patent: Feb. 18, 2020

(54) COLOR SEPARATION IN IMAGES

(71) Applicant: DATACOLOR INC., Lawrenceville, NJ (US)

(72) Inventors: Taeyoung Park, Princeton Junction, NJ (US); Hong Wei, Princeton, NJ (US); Venkata R. Thumu, Pennington, NJ (US); Kathleen A. Edwards, Pennington, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 131 days.

(21) Appl. No.: 15/895,519

(22) Filed: Feb. 13, 2018

(65) Prior Publication Data

US 2018/0245979 A1   Aug. 30, 2018

Related U.S. Application Data

(60) Provisional application No. 62/463,422, filed on Feb. 24, 2017.

(51) Int. Cl.
*G01J 3/28* (2006.01)
*G06T 7/90* (2017.01)
*G06T 7/00* (2017.01)
*G01J 3/50* (2006.01)
*G01J 3/02* (2006.01)
*G06T 7/11* (2017.01)

(52) U.S. Cl.
CPC ............. *G01J 3/2823* (2013.01); *G01J 3/027* (2013.01); *G01J 3/0264* (2013.01); *G01J 3/50* (2013.01); *G06T 7/0002* (2013.01); *G06T 7/11* (2017.01); *G06T 7/90* (2017.01); *G01J 2003/2826* (2013.01); *G06T 2207/10024* (2013.01); *G06T 2207/20101* (2013.01); *G06T 2207/30124* (2013.01)

(58) Field of Classification Search
None
See application file for complete search history.

(56) References Cited

U.S. PATENT DOCUMENTS

| | | | | |
|---|---|---|---|---|
| 7,333,201 | B1* | 2/2008 | Fernandez | G01J 3/46 356/402 |
| 10,337,143 | B2* | 7/2019 | Lu | D06B 3/24 |
| 2002/0102017 | A1* | 8/2002 | Kim | G06K 9/342 382/164 |
| 2005/0036677 | A1* | 2/2005 | Ladjevardi | G01N 21/84 382/162 |
| 2007/0076013 | A1* | 4/2007 | Campbell | G09G 5/06 345/589 |

(Continued)

*Primary Examiner* — Fayyaz Alam
(74) *Attorney, Agent, or Firm* — Leason Ellis LLP

(57) ABSTRACT

Systems, methods and computer program products for segmenting colors in a sample image comprised of pixels using a processor configured by code executing for selecting at least one color value present within the sample image and for each color selected from the sample image comparing the color values of each pixel of the sample image to the selected color value and averaging the color values of each pixels of the sample image having a color value difference below a pre-determined threshold. The method also includes outputting the average color value as a color value data object; and associating each averaged color value with sample image.

20 Claims, 5 Drawing Sheets

(56) References Cited

U.S. PATENT DOCUMENTS

2015/0106235 A1* 4/2015 Gershon ............. G06F 16/5838
705/26.63
2016/0078601 A1* 3/2016 Lee ......................... G06T 5/004
382/264

* cited by examiner

COLOR SEPARATION IN IMAGES

CROSS REFERENCE TO RELATED APPLICATION

The present application claims the benefit of U.S. patent application Ser. No. 62/463,422, filed Feb. 24, 2017, which is hereby incorporated by reference in its entirety.

FIELD OF THE INVENTION

The present invention is directed to systems and methods for identifying colors present in an image and separating out those colors for further processing or analysis.

BACKGROUND OF THE INVENTION

In the textile color quality control market, standard spectrophotometers have been used to measure fabric color for quality control and communication of color parameters. These spectrophotometers have worked well for solid color fabrics, but not for multi-color fabrics and prints. These materials, as well as heathers and fleece, have not been effectively measurable due to the averaging effect of spectrophotometers. Likewise, spectrophotometers do not perform well on multi-component materials such as garments with buttons and zippers or hardware components (e.g. car dashboards).

With the development of new multi or hyper spectral camera-based instruments, image capture and analysis of multi-color material is now possible. However, separating the color in many of the images has been difficult or impossible due to overlapping areas of color or indistinct color boundaries.

There are several well-known methods and techniques for color separation in an image. All of these methods, however, fail to provide an adequate color separation especially in images with overlapping areas of color or with indistinct color boundaries that are found in many textile samples.

Thus, what are therefore needed are systems and methods to identify and separate colors within images, where the images have overlapping areas of color or indistinct color boundaries. Furthermore, what are needed are systems and methods for evaluating the separated colors so as to reduce computational complexity and to speed up analysis.

SUMMARY OF THE INVENTION

Embodiments of the present invention are directed towards systems and methods for segmenting colors in a sample image comprised of pixels using a processor configured by code executing therein. For example, the present invention includes the steps of selecting at least one color value present within the sample image and, for each color value selected from the sample image, comparing the color values of each pixel of the sample image to the selected color value. The method further includes averaging the color values of each pixel of the sample image having a color value that is within a pre-determined range of the selected color value. The method also includes outputting the averaged color value as an averaged color data object and associating each averaged color value with a sample image.

The present invention is also directed to systems for segmenting colors in a sample image. Such a system, in one particular implementation, comprises an image capture device configured to output a digital image of a sample and a processor configured by code executing therein to select at least one pixel from the sample image. For each selected pixel from the sample image, the processor is configured to determine a color value for the selected pixel. The processor is further configured to evaluate the color values of the non-selected pixels in the sample image and determine if the color values are within a pre-determined color range of the determined color value. Where the non-selected pixel color values are outside the pre-determined color range, the processor is configured to alter the color values. The processor is further configured to determine an average color value for all the non-selected pixel color values within the pre-determined color range. The processor is also configured to output the average color value as a data object; and associate each averaged color value with the selection copy image.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the systems and methods described herein are directed towards color segmentation, separation and analysis. In a particular configuration, the systems and methods described herein enable color segmentation of images having overlapping areas of color or with indistinct color boundaries. Thus, the described systems and methods solve the technical problem of obtaining data corresponding to the distinct or separated colors present in an image.

In one or more implementations described herein, a computer processor is configured by code executing therein to determine, select and vary color range membership thresholds within an image. Through such configurations, the processor is able to ignore blended boundaries thus allowing for more a precise selection of unblended central color regions for color segmentation.

While the present descriptions reference various images of items such as fabrics, it will be appreciated that the systems and methods described herein are suitable for analysis of polymers, optical materials, electronics and electrical components, coatings, packaging, paper, food, textiles, printing and lithography, artwork and other documents.

Figure 1:
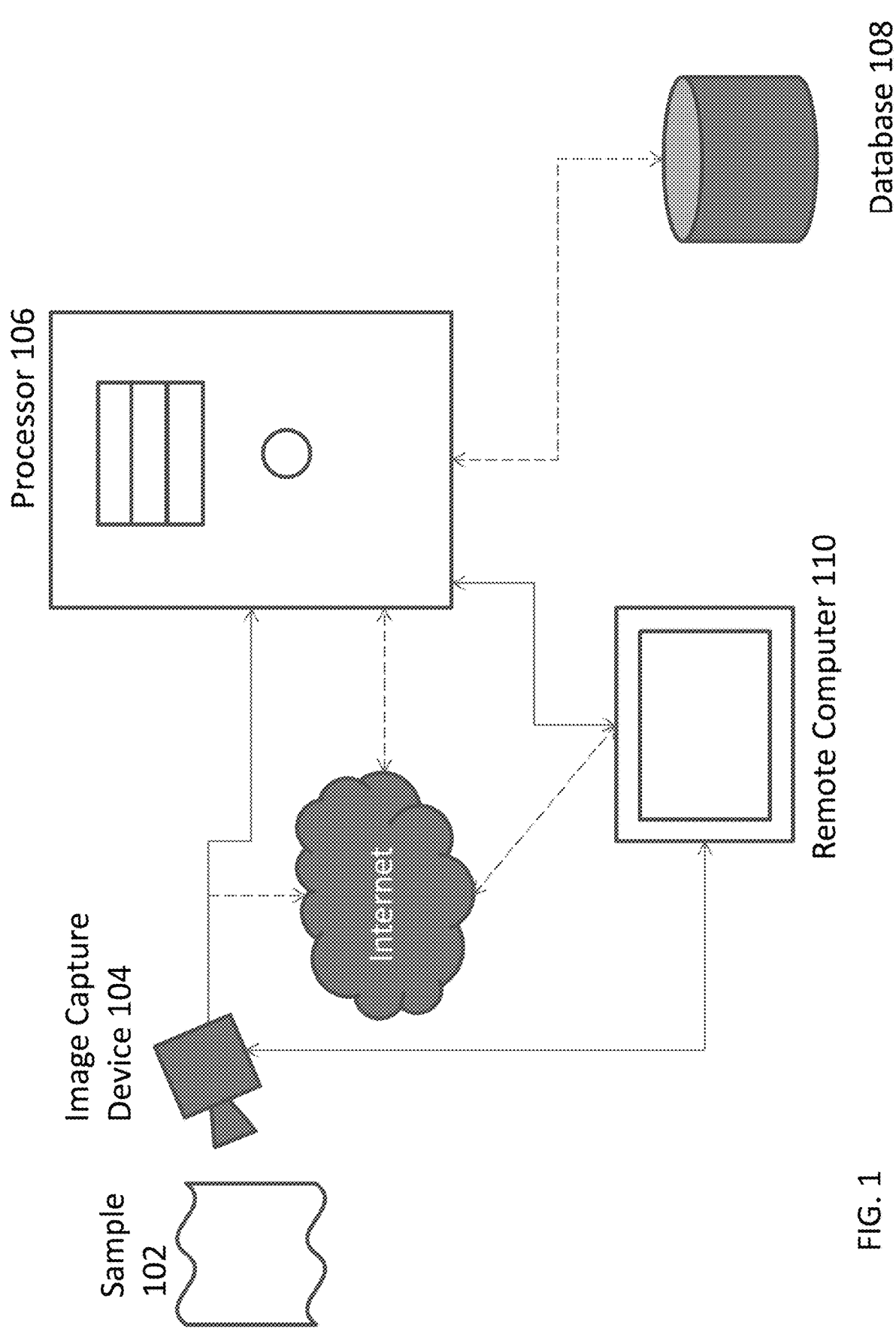
FIG. 1 illustrates a block diagram of a color separation system according to one embodiment of the present invention.

With particular reference to FIG. 1, the present systems and methods are directed to obtaining an image of a fabric, textile or other material sample and determining a simplified spectrum of pre-defined colors based on analysis of the image captured.

Sample

In one arrangement, the sample 102 is any physical article having color or spectral properties in need of analysis. In one particular implementation, the sample 102 is a cloth sample. In an alternative implementation, the sample is a fabric sample such as fleece or fabric blends. In yet another particular implementation, the sample 102 is any material that has color properties desirable for analysis. For example, the sample 102 is a section or portion of stucco, carpet or heather.

Image Capture Device

With general reference to FIG. 1, the sample 102 is placed so that an image of the sample is captured by an image capture device 104. In one particular implementation, the image capture device 104 is a scientific CMOS (Complementary Metal Oxide Semiconductor), CCD (charge coupled device) or other image acquisition device and associated hardware, firmware and software. Furthermore, the image capture device 104 is configured to store or transmit recorded images as a collection of representative pixel points, data sets, binary streams, bit strings, pixel arrays, file or collection of files or other suitable format for the evaluation steps or processes described herein. As used throughout, the images captured by the image capture device 104 include spectral information, RGB information, or other multi-wavelength data representative of light reflected off of the sample. In a particular implementation, the image capture device 104 includes one or more light sources configurable to emit light at a pre-determined wavelength or across a range of wavelengths. Additionally, the image capture device 104 includes one or more selectable filters. For example, one or more polarizing or wavelength filters may be selectively engaged or positioned relative to an image capture sensor of the image capture device 104.

In a particular implementation, the image capture device 104 includes one or more XYZ sensors to capture reflected light and output a value(s) that is correlated to the standard response curve of the human eye.

In an alternative arrangement, the image capture device 104 is one or more hyperspectral sensors or cameras. For example, the image capture device 104 is a hyperspectral camera device configured to collect information as a set or collection of representations of a pre-determined wavelength range of the electromagnetic spectrum, or spectral band. As used herein, such hyperspectral camera devices are configured to output a three-dimensional (x,y,λ) hyperspectral data cube for processing and analysis, where x and y represent two spatial dimensions of the captured scene, and λ represents the spectral dimension (comprising a range of wavelengths).

The image capture device 104, in accordance with one embodiment, is a stand-alone device capable of storing local copies of images within an integrated or removable memory. In an alternative implementation, the image capture device is a configured to transmit one or more captured images to a remote storage device or processing platform, such as processor 106. In configurations calling for remote storage of image data, the image capture device 104 is equipped or configured with network interfaces or protocols usable to communicate over a network, such as the internet.

Alternatively, the image capture device 104 is connected to one or more computers or processors, such as processor 106, using standard interfaces such as USB, FIREWIRE, Wi-Fi, Bluetooth, and other wired or wireless communication technologies suitable for the transmission image data.

In a further implementation, the image capture device 104 is a camera or image recording device integrated into a smartphone, tablet, cell phone, or other portable computing apparatus. In a further embodiment, the image capture device 104 is an "off the shelf" digital camera or web-camera connected or in communication with one or more computing devices.

Computer or Processor

The image obtained by the image capture device 104 is transmitted to one or more color separation processor(s) 106 for evaluation. The color separation processor 106 is configured through one or more software modules to separate colors within the image for further analysis. With further reference to FIG. 1, the processor 106 and remote computer 110 are commercial or custom computing devices. For example, the color segmentation processor 106 may be a collection of computers, servers, processors, cloud-based computing elements, micro-computing elements, computer-on-chip(s), home entertainment consoles, media players, set-top boxes, prototyping devices or "hobby" computing elements.

Furthermore, the color separation processor 106 can comprise a single processor, multiple discrete processors, a multi-core processor, or other type of processor(s) known to those of skill in the art, depending on the particular embodiment. In a particular example, the color segmentation processor 106 executes software code on the hardware of a custom or commercially available cellphone, smartphone, notebook, workstation or desktop computer configured to receive images captured by the image capture device 104 either directly, or through a communication linkage.

The color separation processor 106 is configured to execute a commercially available or custom operating system, e.g., MICROSOFT WINDOWS, APPLE OSX, UNIX or Linux based operating system in order to carry out instructions or code.

In one or more implementations, the color separation processor 106 is further configured to access various peripheral devices and network interfaces. For instance, the color separation processor 106 is configured to communicate over the internet with one or more remote servers, computers, peripherals or other hardware using standard or custom communication protocols and settings (e.g., TCP/IP, etc.).

The color separation processor 106 may include one or more memory storage devices (memories). The memory is a persistent or non-persistent storage device (such as a IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the color separation processor 106 provides for the storage of application program and data files. One or more memories provide program code that the color separation processor 106 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the color separation processor 106 provides for storage of an application program and data files when needed.

Database

The color separation processor 106 is configured to store data either locally in one or more memory devices. Alternatively, the color separation processor 106 is configured to store data, such as image data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the color separation processor 106 to retrieve and store data within the database 108.

In one implementation, each element provided in FIG. 1 is configured to communicate with one another through one or more direct network connections or interfaces, such as a local area network LAN or data cable connection. In an alternative implementation, the image capture device 104, color separation processor 106, remote computer 110 and database 108 are each connected to a network, such as the internet, and are configured to communicate and exchange data using commonly known and understood communication protocols.

Remote Computer

In a particular implementation, the remote computer 110 is a computer, workstation, thin client or portable computing device such as an Apple iPad/iPhone® or Android® device or other commercially available mobile electronic device configured to receive and output data from the color separation computer 106 or database 108. Here, the remote computer 110 includes a display device for displaying data as well as input hardware to permit a user to access information, and to send commands and/or instructions to the color processor 106 and the image capture device.

Acquiring the Image Data

Figure 2:
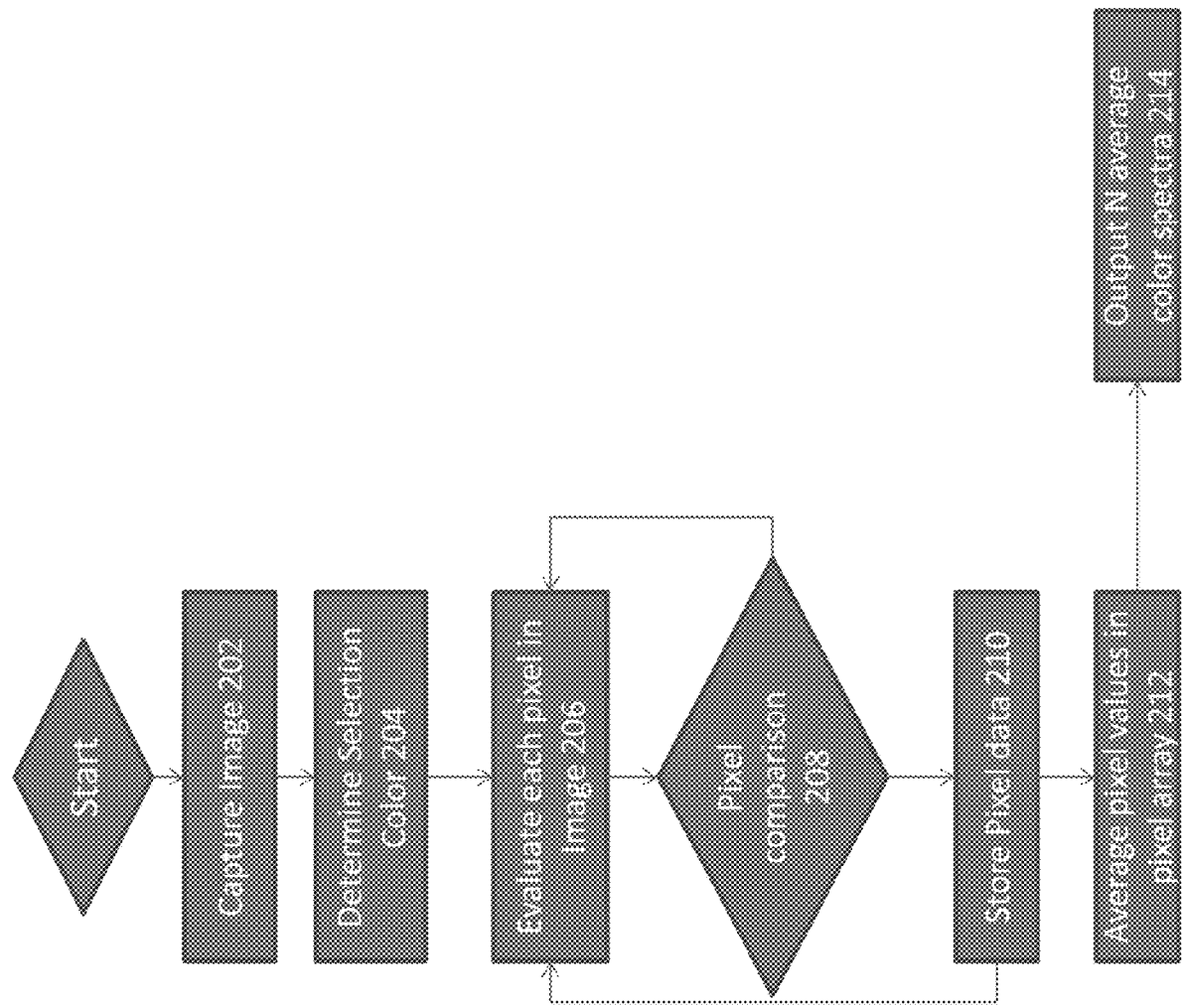
FIG. 2 presents a flow diagram detailing the steps taken in one embodiment of the color separation system according to one embodiment of the present invention.
Figure 3:
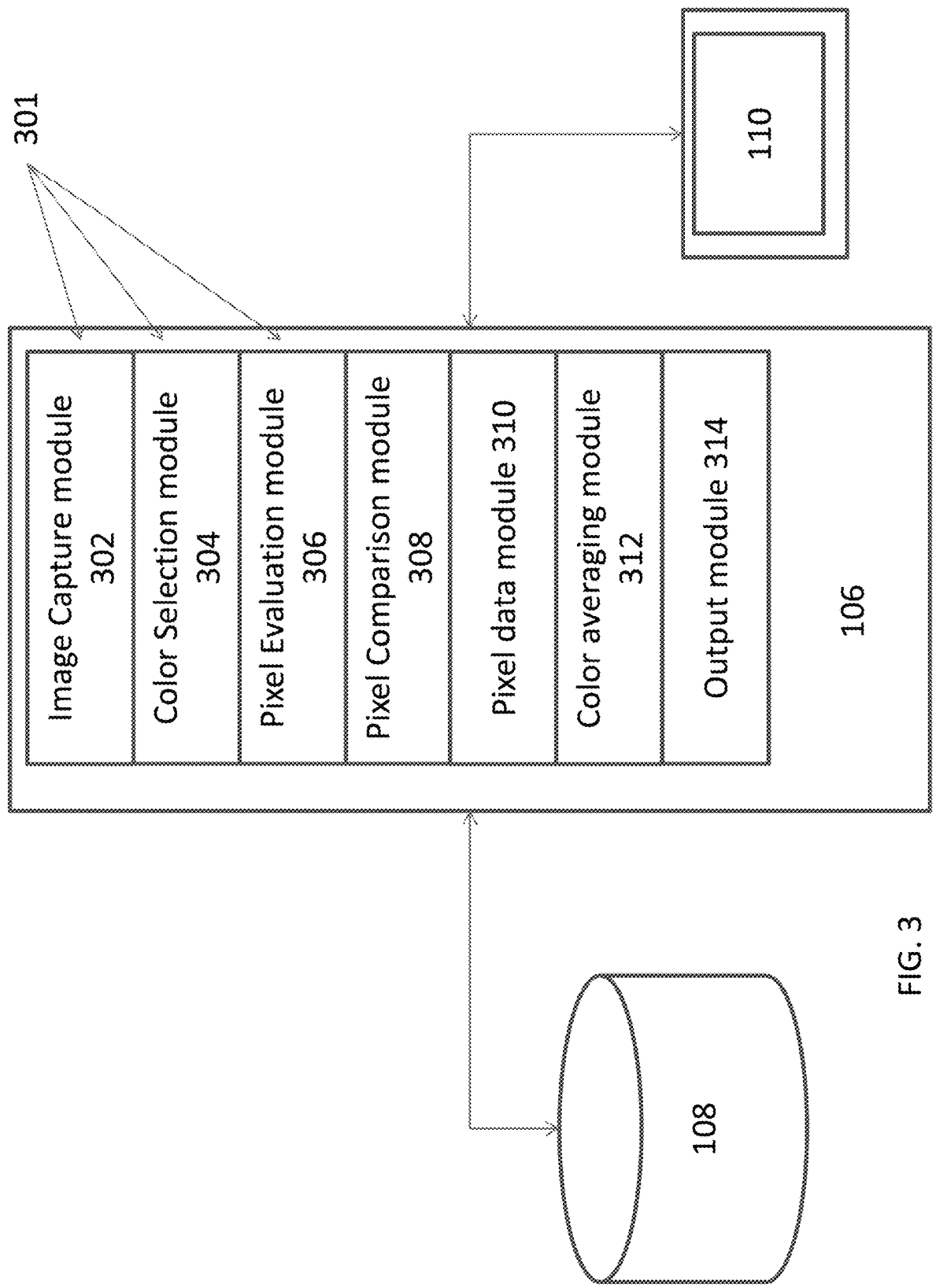
FIG. 3 presents a block diagram detailing specific components of the color separation system according to one embodiment of the present invention.

As shown with reference to FIGS. 2 and 3 the color separation processor 106 is configured by code stored in its memory (not shown). Such code includes one or more software modules 301 that configure the processor 106 to instruct the image capture device 104 to capture an image of the sample 102. For example, the color separation processor 106 is configured by an image capture module 302 to capture the image as provided in step 202 of FIG. 2. Here, the captured image includes data corresponding to a representation of the sample.

In a particular implementation, the image captured by the image capture device 104 is stored within a memory of the color separation processor 106. Alternatively, the image of the sample 102 is stored on a remote database 108 for later retrieval or processing.

The color separation processor 106 is, in one configuration, configured by the image capture module 302 to alter one or more light sources illuminating the sample 102. For example, where the image capture device 102 includes a wavelength variable light source, or multiple light sources capable of emitting the same or different wavelengths, the image capture module 302 instructs the image capture device 104 to capture multiple images of the sample under different lighting conditions. In a further implementation, where the image capture device includes one or more selectable filters, the image capture device is configured to apply a filter prior to acquisition of the image of the sample.

The image capture module 302 configures the color separation processor 106 to format, condition or alter the captured image. For instance, the color separation processor 106 is configured by the image capture module 302 to alter the tone, hue, selection, field of view or other property of the image captured. Additionally, the image capture module 302 configures the color separation processor 106 to realign the image and/or to geometrically transform the image prior to further processing.

Color Selection

Figure 4:
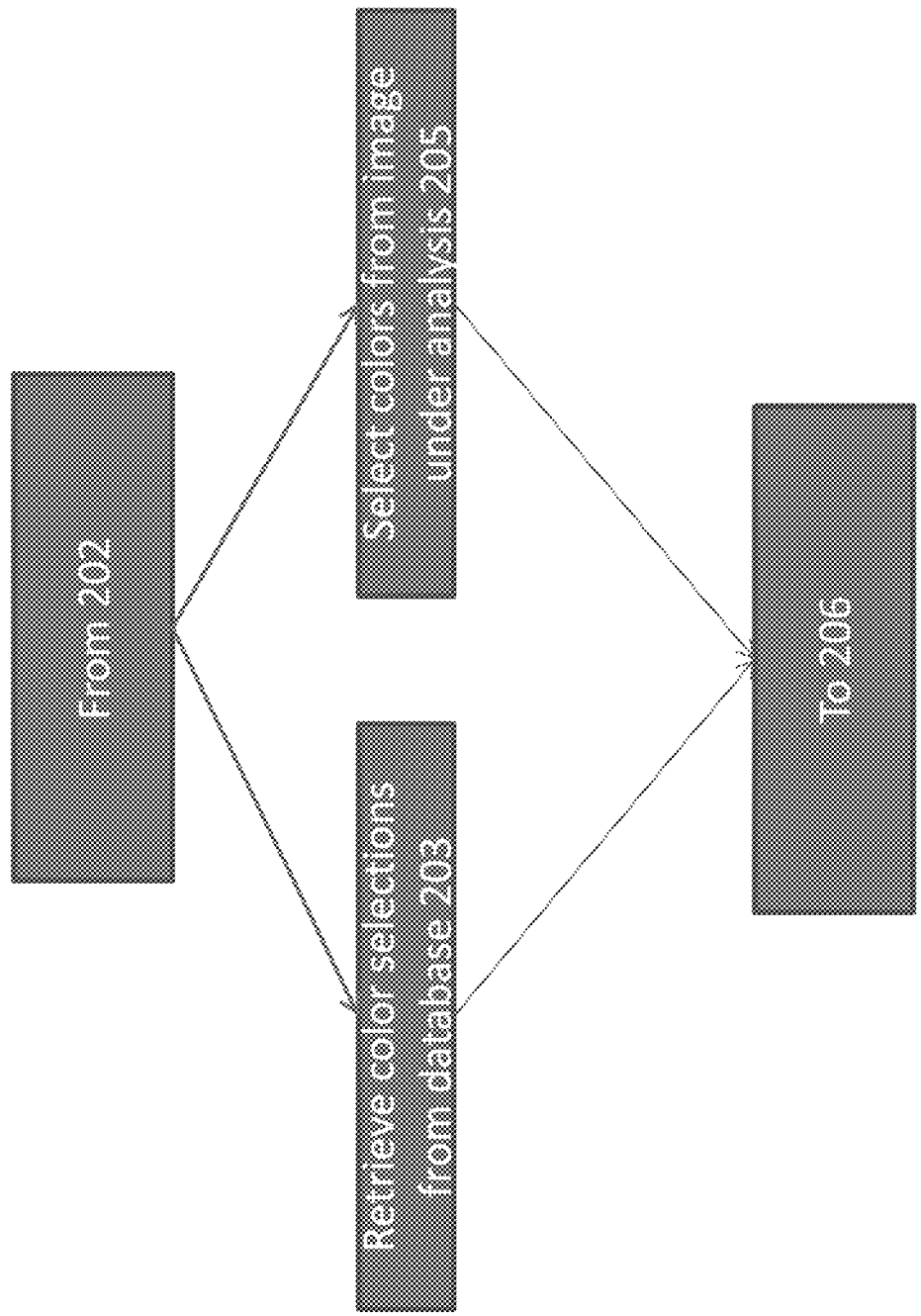
FIG. 4 presents a flow diagram detailing the steps taken in one embodiment of the color separation system according to one embodiment of the present invention.

The color separation processor 106 is further configured by a color selection module 304 to select colors for segmentation or separation, as in step 204. Turning to the flow chart in FIG. 4, the color separation processor 106 is configured by the selection module 304 to access pre-determined color selections. As shown in step 203, the color separation processor 106 accesses from the database 108 one or more color selections previously made. Here, the color selection can be a selection of standard colors used in the production of the sample. Alternatively, the pre-determined color selection is selected from known color values commonly or typically encountered in a particular manufacturing or production process, such as a color of a typical defect or error. In a particular implementation, the color values selected are color values expected to be present in the sample.

In an alternative arrangement, a user may instruct the color segmentation processor 106 to select a portion of the captured image and extract a color value from the selected portion as in step 205. For example, one or more pixels or pixel groups are selected by a user using the color segmentation processor 106 or the remote computer 110. In an implementation where the remote computer 110 instructs the color segmentation processor 106, the remote computer 110 can establish a persistent communication link with the color segmentation processor 106. However, in further implementations the remote computer is configured to send one or more electronic messages that will instruct the color segmentation processor 106 upon receipt to select a particular color or group of colors.

By way of non-limiting configuration, the user may vary the color selection based on the content of the image. For instance, the user selects a portion of the pixels of the image that correspond to a particular feature or component of interest. In an alternative implementation, the processor is configured by one or more image classifier algorithms (such as image segmentation techniques commonly used in the art) to automatically detect items, patterns, object or features of interest within the image. By way of non-limiting implementation, the color segmentation processor 106 is configured to obtain color selections from a region of the image comprising one or more pixels. For instance, where the image captured is of an object having small detailed regions of interest (such as regions of lace fabric), the color segmentation processor 106 is configured by a user to select a grouping of pixels representing the area of interest. Likewise, where the area of interest includes a substantial portion of the image, the color segmentation processor 106 is configured to select a larger grouping of pixels. Where larger groups of pixels are selected, in one implementation, the color segmentation processor 106 is configured to average the color value to correct for spatial inhomogeneity of a larger object (such as a fabric sample).

In a further implementation, the color segmentation processor 106 is configured to automatically select the number of pixels based on one or more image recognition algorithms executed by the color segmentation processor 106. For example, where the image is of a multi-component material (such as garments with buttons), one or more image recognition algorithms are used to identify the pixels corresponding to the area of interest and automatically select those pixels for further processing.

By way of further example, the color selection processor 106 is configured by the color selection module 304 to permit a user to select one color from an image containing many colors. For example, a user may select a single color from an image of a fabric pattern. It should be appreciated that the color of interest for the user can occur at many locations in the image, and the regions containing the color may be discontinuous such as polka dots in a fabric pattern.

In one implementation, the user selects a color identifier (such as a color name, reference, or value(s) desired). Alternatively, the user selects, using a user interface, a region of uniform color within the image that typifies the desired color. In this particular implementation, the color selection module 304, or a submodule thereof, selects or identifies a region of the image based on the user input. In a further arrangement, the user selects a region based on the content of the region (such as a item of interest). Here the size of the selection is an approximation of the pixels representing the user's selection. In an alternative configuration, the user chooses a region of the image based on a pre-defined selection window. For example, the color selection module 304 configures the generation of a selection window having specific dimensions. In one arrangement, the selection window has dimensions equal to a single pixel (e.g. 1×1 pixel). In an alternative arrangement, the selection window is 5×5 pixels. It will be appreciated that a small number of pixels relative to the overall image size, say 5×5, is appropriate to isolate narrow regions such as components of a lace fabric depicted within an image, while a large number of pixels, say 50×50, is appropriate to average over large regions, for example to remove the texture in a knit fabric.

Upon selection of the desired region, an average spectrum is calculated from the color values of the pixels included within, or otherwise bounded by, the selection window. Based on the calculated average spectrum, the entire image is searched to identify each pixel having a color within a pre-determined threshold or range of the average color value obtained.

The color selection module 304 is further configured to obtain a second average spectrum value for all of the pixel identified in the search. This second average spectrum typifies the desired color as it appears throughout the image and can be used to segment the images based on the second average color value In yet a further implementation, the color selection module 304 includes one or more submodules that provide spectral and color information concerning the pixels selected prior to confirming a selection. For instance, one or more submodules of the color selection module 304 configures the color selection processor 106 to provide or generate data values for the pixels selected prior to extraction and further processing by the color segmentation processor 106. In one non-limiting implementation, the color segmentation processor 106 is configured to evaluate the color and spectral properties of the color selection and send that information to the remote computer 110 prior to further processing. In this arrangement, the user may be prompted with an alert identifying the average pixel color values. Alternatively, the user could be provided with a list of color values identified within the selection. The user is able to confirm the selection or make a different or modified selection of pixels. Alternatively, the color selection processor 106 is configured by the color selection module 304 to compare the pixel color values of the pixel selection against a threshold value or reference. Where the pixel values are within a pre-determined range of the threshold value, the selection is made. Where the identified values are outside of the—pre-determined range, the user is provided with an alert, or the option to proceed with the selection.

By way of non-limiting implementation, the color selection module configures a processor of the color selection processor 106 to further to select second region of the image in addition to the initially selected region and provide an updated visual representation of the image showing the pixels corresponding to the second region which have color values within a given range of the average color value of the first region.

Continuing with the flow diagram of FIG. 2, the color values of the selected pixels are extracted, and those color values are stored as the color selection. In one or more particular implementations, the color segmentation processor 106 automatically selects a pre-determined number of colors based on the colors present in the image. Such selections can be selected on the basis of prevalence within the image or based on capturing the gamut or spectrum of colors present in the image.

In one or more implementations, the colors selected in step 203 or 205 are stored in the local memory or the color segmentation processor 106 or the database 108. For example, the colors selected are stored as elements in an array accessible and usable by the color segmentation processor 106.

Returning to FIG. 3, the color segmentation processor 106 is configured by a pixel evaluation module 306 to evaluate the pixels of the captured image of the sample. In one implementation, the color segmentation processor 106 is configured to evaluate each pixel of the image and extract RGB or tristimulus values associated with each pixel to a data object. For example, the color segmentation processor 106 is configured to generate an array where each element of the array corresponds to a pixel of the image and the value associated with each element is the color value of the pixel in question.

As shown in step 208, the color segmentation processor 106 is configured to compare the extracted pixel values of the image to the selected colors. For instance, the color segmentation processor 106 is configured by a pixel comparison module 308 to compare the color value(s) extracted from the pixel to the stored color selection values. In one particular implementation, the color segmentation processor 106 is configured to compare the color values of each pixel of the image to one of the selected colors in a sequential manner. Here, each of the pixels of the image is compared against one of the selected colors. Once all of the pixels have been evaluated against a single color value, the pixels are then evaluated against subsequent color selection values.

In a particular implementation, the color segmentation processor 106 is configured to determine if the color value of each pixel evaluated equals the color value of the selection. However, in an alternative arrangement, the color segmentation processor 106 is configured to determine if the color value of the evaluated pixel is within a set range of the selected color value. For instance, the color segmentation processor 106 is configured to determine that the color value of an evaluated pixel matches one of the selected colors where the evaluated pixel color value is within a predetermined range of color variation. In one implementation, the threshold or color variation range is determined according to a color distance metric calculated according to a color distance formula. For example, the degree of color variation separating the evaluated color value and the selected color value is determined according to a color distance formula that is one of CIE76, CIE94 or CIEDE2000 color distance formulas. In a particular implementation, the default threshold value is in a range of 5DE of the selected color value. In an alternative implementation, the threshold value is within 2DE of the selected color value.

In a particular implementation, where the color value of a given pixel is matched to a selection color, the color segmentation processor 106 is configured to save the matched pixel to a new image such that the positional and spectral data of the matched pixel is maintained within a new image. As shown in step 210, the color segmentation processor 106 configured by a pixel data module 310 stores each matched pixel to a new image preserving its spectral and positional data.

In a further implementation, one or more submodules of the pixel data module 310 configures the color segmentation processor 106 to provide a user with a real-time identification of the pixels captured by the threshold(s) selected by the user. For instance, based on the threshold values selected either by the user or automatically by the processor, a real-time virtual representation of the pixels encompassed by the threshold is provided to the user. In one or more implementations, the color segmentation processor 106 is configured to alter the threshold selected based on the number of pixels captured by the threshold. Thus, in one arrangement, the color segmentation processor 106 is configured to implement an iterative process of adjusting the threshold to encompass a desired grouping of pixels. In one arrangement, the desired pixel grouping is defined by the user as a selection applied to the image.

Figure 5:
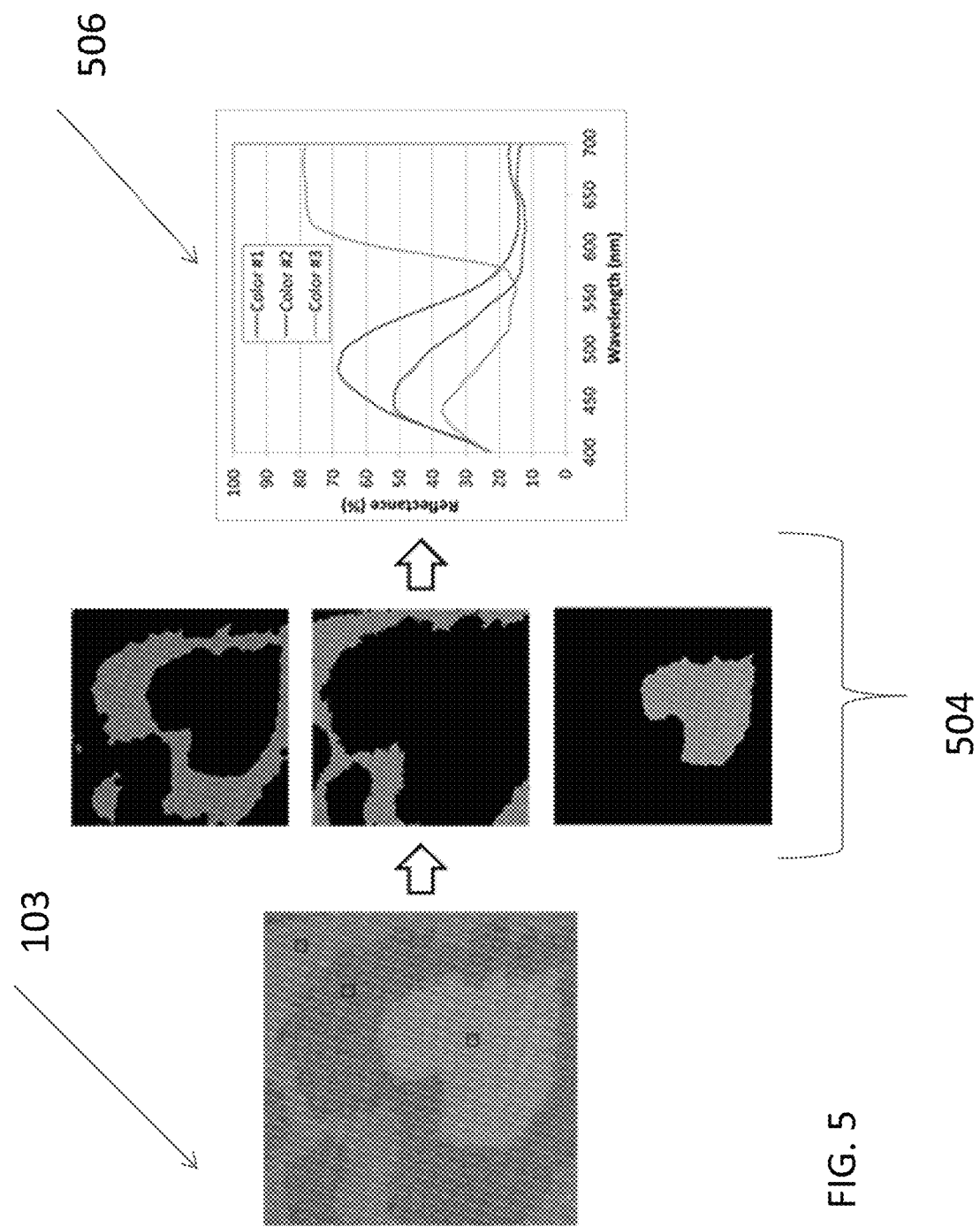
FIG. 5 presents a work flow detailing the steps taken in one embodiment of the color separation system according to one embodiment of the present invention.

As shown with reference to FIG. 5, this newly created copy image 504 provides an image where the spatial and spectral properties of pixels matching the selected color are preserved, but lack spectral or color properties for pixels that did not match the selection color. In one implementation, the color segmentation processor 106 is configured to generate the new copy image 504 by copying the positional and spectral data of each pixel of the original pixel image where there is a match to the selection color, while only copying the positional data of pixels that do not match the selection color.

In an alternative arrangement, only the pixels that are matched with the color selection are copied to a new copy image 504. Here, to reproduce the originally captured image with only the matched color(s), the color segmentation processor 106 is further configured to fill, or otherwise generate, pixel color values to complete the monochromatic or semi-monochromatic representation of the sample. In one arrangement, the color segmentation processor 106 assigns pixels not matching the selected color a pre-determined color value, such as black.

In a further arrangement, the color segmentation processor 106 is configured by one or more submodules of the pixel data module 310 to mask, alter or remove the color values from those pixels not matched to the selection color.

In this arrangement, multiple masks, one for each selection color, is applied to a single image so that only the matched color is visible depending on the selection of the mask. In this arrangement, a new copy image is not generated.

Those skilled in the requisite art will appreciate that it is possible to identify pixels that are within the threshold value of more than one of the selection colors. For example, where a first selection color A is compared to the color values of the image pixels, a pixel Q is identified as within 2DE of A. Likewise, where a second selection color B is compared to the color values of the image pixels, the pixel Q is also identified as matching. In one implementation, the color segmentation processor 106 is configured to mask or extract pixel Q upon matching with selection color A. In this arrangement, pixel Q, and all other pixels that matched selection color A, are no longer evaluated when selection color B is used to evaluate the remaining pixels. Alternatively, the color segmentation processor 106 is configured by one or more submodules of the pixel data module 310 to generate a new image for each selection color using the original image 103. In this way, where there is an extracted pixel color value that falls within the pre-determined range of more than one selection color, that pixel will be present in each new copy image 504. In addition to being used to evaluate the color values of the pixels, such pixel's presence across multiple new copy images 504 may be used as calibration or visual reference points between multiple images having different appearances due to the lack of color outside the selected color.

In yet a further implementation, the color segmentation processor 106 is configured to perform morphological operations after color separation to reduce or increase the pixels belonging to the chosen color. By way of non-limiting example, such morphological operations carried out by the color separation processor 106 results in a more precise conformation of the boundary or delimiter between a pixel or group of pixels having one color and neighboring pixels having a different color. Such morphological operations result in extracted color values that incorporate fewer neighboring pixels having non-identical color values. In one or more implementations, the color segmentation processor 106 is configured to carry out morphological operations in accordance with those provided in "An Introduction to Morphological Image Processing" Edward R. Dougherty, ISBN 0-8194-0845-X (1992), herein incorporated by reference as if provided in its entirety. By way of non-limiting implementation, the color segmentation processor is configured to perform a morphological operation on the sample image so as to alter the color value of at least one pixel of the sample image. Here, each color value altered will either increase or decrease the total number of pixels having the selected color. In one or more implementations, the color segmentation processor is configured to perform at least one morphological operation on an image to alter the color value of at least one pixel of the sample image to conform or substantially differ from the selected color. Here, substantially different means that the color value of the altered pixel is such that it is not included within the segmentation.

It will be appreciated that the generation of new copy images 504 provide visual assistance to a user or operator and can be omitted in a completely automated procedure. For instance, the pixel data module 310 configures the color segmentation processor to generate a data object, such as a pixel array, to store the spatial and spectral data of each pixel matching a given color selection without the necessity of generating an image.

Upon generation of a collection of pixels matched to one of the selected colors, the color segmentation processor 106 is configured to average the color values of each pixel to generate an average color value. This average color value is an average value representative of the color values matched to the selected color. It will be understood that depending on the pre-set threshold range, the average color can match the selected color. However, depending on the threshold value, the average color values differ from the selected color value.

As shown in step 212, the color segmentation processor 106 is configured by a color averaging module 312 to average the reflectance spectra of all the pixels having a color match to the selection color to create a single average reflectance spectrum for the selected color. The color segmentation processor 106 is configured to repeat the color averaging for each selection color. As such, the color segmentation processor 106 is configured to generate a collection of N spectra, where N represents the number of selection colors. With reference to the spectrum analysis 506, the reported spectra from the original image, which could be in the millions, are reduced to N.

As shown in step 214, the N number of average color spectra generated in step 212 are output to a remote computing device 110 or the database 108 for future use. For example, the color segmentation processor 106 is configured by an output module 314 to output the average color values as a spectral graph 506 or other data set associated with the original image of the sample 102.

General Information

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method for segmenting colors in a sample image comprised of pixels using a processor having a memory and configured by code executing therein, the method comprising:

selecting at least one color value;
  for each color value selected:
    comparing the color values of at least a portion of the sample image to the selected color value;
    identifying each portion of the sample image having a color value within a pre-set difference threshold of the selected color value;
    averaging the identified color values; and
    outputting the average color value as a color value data object.

2. The method of claim 1, further comprising:
  associating the data object for each selected color with the sample image as a combined data object.

3. The method of claim 1, wherein the comparing step includes:

comparing the color value of each pixel of the sample image against the selected color value.

4. The method of claim 3, further comprising:
performing at least one morphological operation on the sample image to alter the color value of at least one pixel of the sample image to conform or substantially differ from the selected color.

5. The method of claim 4, wherein one of the at least one morphological operation is performed prior to comparing the color values of at least a portion of the sample image to the selected color value.

6. The method of claim 1, wherein the selected colors are present within the sample image.

7. The method of claim 1, wherein selecting the color values further comprises:
accessing a pre-set list of color values.

8. The method of claim 1, wherein selecting the color values further comprises:
selecting at least one pixel of the sample image; and
storing a color value associated with the selected pixel in a color selection data object by a pre-set list of color values.

9. The method of claim 1, wherein comparing the color values further comprises:
determining the color value of each pixel in the image;
establishing a match between the selection color and the color value of a pixel where the difference in color values is less than 5.

10. The method of claim 9, wherein the difference in color values is between 2.5 and 5DEs.

11. The method of claim 10, wherein the establishing of a match further comprises:
evaluating the difference between the selection pixel color values and the image pixel color values according one of CIE76, CIE94 or CIEDE2000 color distance formulas.

12. The method of claim 1, wherein selecting at least one color value from the sample image further comprises:
identifying a region of the image;
extracting at least one color value found within the identified region; and
generating a visual representation of the image highlighting each pixel that has a color value within a given range of the extracted color value.

13. The method of claim 12, wherein the extracted color value is an average color value obtained by averaging the color values of the pixels within the identified region.

14. The method of claim 12, wherein identifying a region of the image includes:
performing image segmentation to identify one or more features of interest; and
selecting one or more identified features of interest.

15. The method of claim 12, further comprising:
selecting a second region of the image; and
providing an updated visual representation of the image showing the pixels corresponding to the second region which have color values within a given range of the extracted color value of the second region.

16. The method of claim 1, wherein selecting at least one color value from the sample image further comprises:
identifying a region of the image;
extracting at least one color value found within the identified region;
obtaining a first average spectrum value of the at least one extracted color value;
identifying each pixel of the image within a pre-determined range of the obtained first average spectrum value;
obtaining a second average spectrum value from the color value of each pixel identified as within a range of the first average spectrum value; and
identifying each pixel in the image within a pre-determined range of the second average spectrum value.

17. A method for segmenting colors in a sample image comprised of pixels using a processor configured by code executing therein, the method comprising:
selecting at least one color value found within the sample image;
for each color selected from the sample image:
comparing the color values of each pixel of the sample image to the selected color value:
for each pixel of the sample image that matches the selection color,
storing the color value of each pixel of the sample image as an element of a selection array,
averaging the color values of the elements of the selection array, and
outputting the average color value as a data object; and
associating each averaged color value with the sample image.

18. A system for segmenting colors in a sample image comprising:
a processor having a memory configured by code executing therein to:
select at least one pixel from sample image;
for each one of the selected pixels from the sample image:
determine a color value for the selected pixel,
generate a copy of the sample image,
compare the color values of sample image copy to the determined color value,
change the color values from each of the pixels in the sample image copy that are not matched with the selection color to a default color value;
average the color values of the pixels in the sample image copy not having a default color value; and
output the average color value and the sample image copy as a data object.

19. The method of claim 18, further comprises:
performing, prior to averaging the color values, at least one morphological operation on each selection copy image so as to alter the color value of at least one pixel of the selection copy image to conform or substantially differ from the selected color.

20. The method of claim 17, wherein comparing the color values further comprises:
determining the color value of each pixel in the image; and
establishing a match between the selection color and the color value of a pixel where the difference in color values is less than 5 DEs.

* * * * *